United States Patent

[11] 3,554,115

[72] Inventors Charles G. Manley
   Mission Hills, Kans.;
   Francis Leo Lomaglio, Kansas City, Mo.
[21] Appl. No. 793,245
[22] Filed Jan. 23, 1969
[45] Patented Jan. 12, 1971
[73] Assignee Manley, Inc.
   Kansas City, Mo.
   a corporation of Missouri

[54] TEMPERATURE-RESPONSIVE PROTECTIVE SYSTEM FOR AUTOMATIC POPCORN POPPERS
10 Claims, 3 Drawing Figs.

[52] U.S. Cl. .................................................. 99/238.3,
   99/238.4
[51] Int. Cl. .................................................. A23l 1/18
[50] Field of Search ...................................... 99/238.3,
   238.1, 238, 238.2, 238.4, 238.5, 238.7, 238.6

[56] References Cited
UNITED STATES PATENTS

| | | | |
|---|---|---|---|
| 2,017,293 | 10/1935 | Priest .......................... | 99/238.3 |
| 2,771,836 | 11/1956 | Denehie ...................... | 99/238.4 |
| 3,120,168 | 2/1964 | Lippert ........................ | 99/238.3 |

Primary Examiner—Robert W. Jenkins
Attorney—Schmidt, Johnson, Hovey, Williams & Chase ABSTRACT: In an automatic popcorn popper, a thermostat senses the temperature drop of the cooking kettle at the time that the kettle is supplied with corn and seasoning. The temperature will decrease to a predetermined level or below if the proper quantities of corn and seasoning are supplied. Depletion of either ingredient will be sensed since the temperature will fail to decrease to such level, whereupon automatic shutoff of the popper is effected and an alarm signal is produced. A high temperature thermostat also effects shutoff if, during cooking, the kettle reaches a temperature indicative of overheating of the product.

PATENTED JAN 12 1971 3,554,115

INVENTORS.
Charles G. Manley
Francis Leo LoMaglio

BY Schmidt, Johnson, Hovey,
Williams & Bradley.
ATTORNEYS.

TEMPERATURE-RESPONSIVE PROTECTIVE SYSTEM FOR AUTOMATIC POPCORN POPPERS

This invention relates to improvements in control systems for automatic popcorn poppers and, in particular, is directed to protection against continued operation of an automatic popper in the event that the corn or seasoning supplied thereto should become depleted or overheating should occur during cooking of the product.

An automatic popcorn popper has a cooking kettle which is periodically supplied with corn, seasoning and salt at the commencement of each cooking phase. After cooking is completed, the kettle is dumped prior to the resupplying operation. These functions are all effected automatically without the need for strict operator attention with the result that automatic poppers of this type are capable of producing a cooked popcorn product on a continuous basis and in large quantities for ultimate sale to the consumer at grocery stores and other outlets.

In the operation of an automatic popper, continuing resupply of corn, seasoning and salt in proper quantities is absolutely essential to the production of a quality product. The measuring of proper quantities of each at the time of resupplying the kettle is readily accomplished; however, inadvertent depletion of either corn or oil can have serious consequences if the popper is permitted to continue in operation. The seasoning is commonly coconut or cottonseed oil which, if not supplied to the kettle, causes the production of a burnt and unpalatable product. Failure to supply corn to the kettle is considerably more serious in that hot oil will then be dumped from the kettle at the termination of the cooking phase, thereby constituting an extreme hazard to the operator or other personnel in close proximity to the popper. Additionally, even if proper quantities of the ingredients are supplied, overheating of the kettle caused by a system malfunction, such as sticking of the operating thermostat, could result in explosion and fire as the temperature of the oil is elevated to the ignition point.

It is, therefore, an important object of the present invention to provide an improved control system for an automatic popcorn popper in which the failure to load corn or seasoning into the kettle is sensed and appropriate action taken to prevent the production of an inferior product or the development of a hazardous condition.

Another important object of the invention is to provide a control system as aforesaid which prevents reheating of the kettle after the loading phase in the event that depletion of corn or oil is sensed.

Still another important object of this invention is to provide such a control system which actuates an appropriate alarm to signal the operator in the event that improper loading of the kettle occurs.

Furthermore, it is a specific and important aim of the invention to provide a control system as aforesaid incorporating a timed operating cycle during which dumping and reloading of the kettle is effected, and wherein such cycle is prematurely terminated to prevent heating of the kettle in the event that proper quantities of corn and seasoning are not resupplied to the kettle during the loading thereof.

Additionally, it is an important object of the invention to provide such a control system in which the kettle is protected against overheating in the event that the normal components of the system should malfunction.

Figure 3:
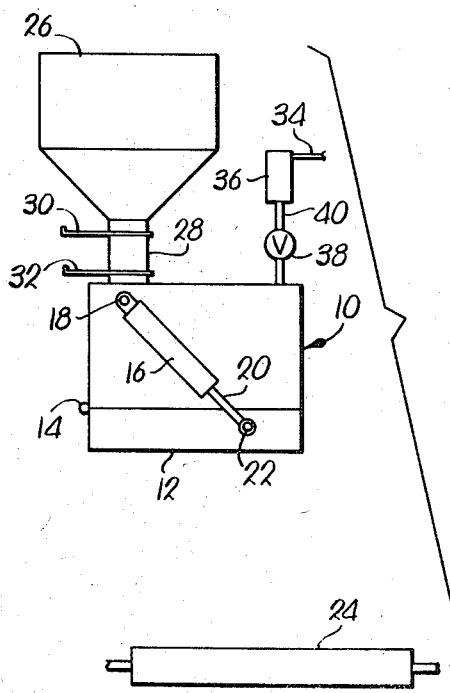
FIG. 3 is a diagrammatic representation of an automatic popcorn popper.

Referring initially to FIG. 3, the automatic popcorn popper there represented includes a cooking kettle 10 having a bottom section 12 which is hinged to the main body of the kettle 10 as indicated at 14. The bottom section 12 houses a gas burner and three thermostats to be subsequently described with reference to FIG. 1. The bottom section 12 is swung between open and closed positions by a pneumatic cylinder 16 pivotally mounted at 18 to the upper, main body portion of the kettle 10, the cylinder 16 having a piston rod 20 extending therefrom and pivotally joined at 22 to the bottom section 12. Opening of the bottom section 12 dumps the cooked popcorn product within the kettle 10 onto the upper surface of an underlying conveyor 24.

A hopper 26 above the kettle 10 receives raw corn and feeds the same to the kettle via a measuring cylinder 28 provided with upper and lower slide valves 30 and 32 respectively. Seasoning such as coconut or cottonseed oil is supplied by an oil line 34 to a volumetric measuring device 36. An oil discharge valve 38 controls delivery of the oil from the measuring device 36 to the kettle 10 through a conduit 40.

Figure 1:
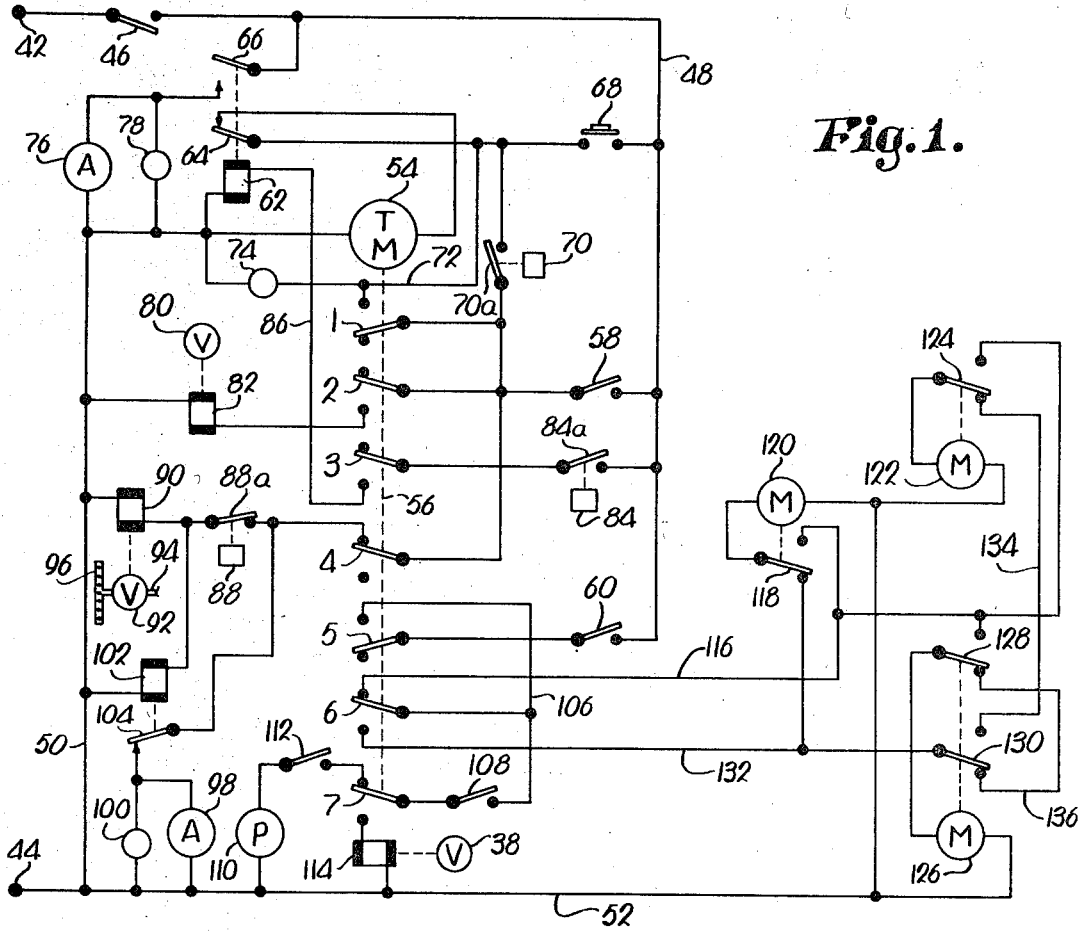
FIG. 1 is an electrical schematic diagram of the control system of the present invention.

Referring to FIG. 1, the electrical control system obtains suitable power at a pair of terminals 42 and 44. A main switch 46 is connected in series with a line 48 extending from terminal 42 to the various portions of the system to be subsequently described. A pair of interconnected lines 50 and 52 extend from the power terminal 44 and form the other electrical power connection.

A timer motor 54 has an output shaft diagrammatically illustrated at 56 upon which seven timing cams (not shown) are mounted to control the operation of seven cam switches designated 1, 2, 3, 4, 5, 6 and 7. The cam switches 1—7 are shown in positions corresponding to time zero in the timing chart of FIG. 2 where the timer motor 54 is deenergized. A kettle on-off switch 58 is connected in series between line 48 and the pole of cam switch 2, and a supplies on-off switch 60 connects line 48 to the pole of cam switch 5.

A relay forming a part of protection circuitry to be subsequently discussed has a coil 62 and two relay switches 64 and 66. One side of the timer motor 54 is connected directly to line 50, the other side thereof being connected to line 48 through the relay switch 64 and a normally open, pushbutton start switch 68 in series therewith. An operating thermoslat 70 has a switch 70a which is connected in series between the interconnected poles of cam switches 1 and 2 and the pole of relay switch 64. A holding circuit for the timer motor 54 is formed by a lead 72 which connects the pole of relay switch 64 to the upper contact of cam switch 1. An indicator lamp 74 is connected from such upper contact to line 50.

An audible alarm 76 such as a buzzer or bell is connected between the normally open contact of relay switch 66 and line 50, an indicator lamp 78 being connected in parallel therewith. The movable pole of relay switch 66 is connected directly to line 48.

A valve 80 controls delivery of air under pressure to cylinder 16 and is operated by a solenoid 82 which is connected in series between line 50 and the lower contact of cam switch 2. A low temperature thermostat 84 has a switch component 84a interconnecting line 48 and the pole of cam switch 3. A lead 68 connects the lower contact of cam switch 3 to the relay coil 62, the other side of coil 62 being directly connected to line 50.

A high temperature thermostat 88 has a normally closed switch 88a connected in series between the upper contact of cam switch 4 and an electrical actuating device in the nature of a solenoid 90. The other side of the solenoid 90 is directly connected to line 50, the solenoid 90 being employed to operate a valve 92 in a gas line 94 which feeds a burner illustrated diagrammatically at 96.

An audible alarm 98 such as a bell or buzzer and an indicator lamp 100 in parallel therewith are operated by a relay having a coil 102 and a relay switch 104. When closed, as illustrated, the switch 104 connects both the alarm 98 and the lamp 100 to the upper contact of cam switch 4.

The upper contact of cam switch 5 and the movable pole of cam switch 6 are interconnected by a lead 106 which extends to the pole of cam switch 7 through a pump on-off switch 108. The pump is illustrated schematically at 110 and is interposed in line 34 (FIG. 3) for the purpose of pumping oil from a storage drum (not shown) to the volumetric measuring device 36. Pump operation is controlled by a pressure responsive switch 112 associated with the measuring device 36 and connecting the pump 110 (upon closure of switch 112) between the upper contact of cam switch 7 and line 52. A solenoid 114 is connected between the bottom contact of cam switch 7 and line 52, and serves to operate the oil discharge valve 38.

The upper contact of cam switch 6 is connected by a lead 116 to the upper contact of a single pole switch 118 operated by the output shaft of a motor 120. The purpose of the motor 120 is to provide a means of operating a conventional salt dispenser (not shown) which would normally be mounted atop the kettle 10 and arranged to dispense a measured amount of salt into the kettle 10 during each operational cycle of the motor 120 as such dispenser is operated thereby. The switch 118 may comprise a carrier switch operated by a cam on the motor shaft, with the movable pole of the switch 118 being in engagement with its lower contact as illustrated throughout each revolution of the motor shaft until such shaft has revolved nearly 360°, whereupon the pole of the switch 118 is shifted into engagement with the upper contact thereof.

A motor 122 operates the upper slide valve 30 (FIG. 3) and is similarly provided with a carrier switch 124 which is also in the position illustrated until such time that the output shaft of motor 122 has nearly completed a revolution. The lower slide valve 32 is operated by a motor 126 having a pair of single pole switches 128 and 130 responsive to the position of its output shaft in the same manner as described above the switches 118 and 124. The lead 116 extends to the upper contacts of switches 124 and 128, while a lead 132 extends from the lower contact of cam switch 6 to the lower contact of motor switch 118 and the movable pole of motor switch 130. The motors 120, 122 and 126 are connected to the poles of respective motor switches 118, 124 and 128, with the common side thereof being connected directly to the line 52. A lead 134 interconnects the lower contact of switch 124 and the upper contact of switch 130, and a lead 136 interconnects the lower contacts of switches 128 and 130.

OPERATION

Figure 2:
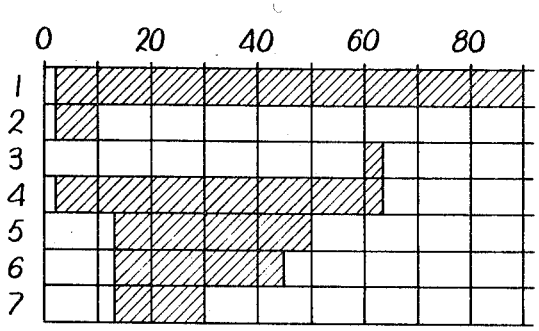
FIG. 2 is a chart showing the timing of the various cam switches.

Operation of the automatic popper is begun by closing the main switch 46 and the kettle, supplies, and oil pump switches 58, 60 and 108. The start switch 68 is then momentarily actuated by depressing its push button, thereby effecting energization of the timer motor 54 through the normally closed contact of relay switch 64. The operational cycle of the timer is 90 seconds in length as depicted in FIG. 2, the seven bar graphs of the timing chart being designated by the numbers 1 through 7 to correspond to the reference numeral designations of the cam switches. The unshaded portions of the chart correspond to the positions of respective switches as illustrated in FIG. 1; the shaded areas represent a change to the operated position of the respective switch. Cam switch 1 is operated at approximately 2 seconds after time zero, the pole of switch 1 shifting into engagement with the upper contact thereof to establish a holding circuit for the timer motor 54 through switch 58, cam switch 1, lead 72, and relay switch 64. The push button of the start switch 68 may thus be released once the timer motor 54 starts and holds.

It may also be appreciated by viewing FIG. 2 that cam switches 2 and 4 are operated at the 2-second point along with the cam switch 1. This energizes solenoid 82 to effect actuation of air valve 80 and thereby supply air under pressure to the pneumatic cylinder 16. The piston rod 20 extends and swings bottom section 12 about hinge 14 to an open position which is ineffective at this time since the machine is just being initially placed in operation. Simultaneously, the opening of cam switch 4 deenergizes solenoid 90 which was previously energized for a short period during the initial start up procedure. Deenergization of solenoid 90 closes the gas valve 92 to deactivate the burner 96; therefore, heat is not applied to the kettle 10. The cam switches 2 and 4 assume their normal positions again at 10 and 63 seconds respectively in the timing cycle, thereby effecting reclosure of the kettle 10 at 10 seconds and activation of the burner 96 at 63 seconds, assuming in the latter case that the kettle 10 has been properly loaded with corn and seasoning in the intervening period.

After the bottom section 12 of the kettle 10 is reclosed, cam switches 5, 6 and 7 are simultaneously operated. This occurs at approximately 13 seconds in the timing cycle and effects energization of the salt dispenser motor 120, the lower slide valve motor 126, and the solenoid 114 which operates the oil discharge valve 38. The circuit to motors 120 and 126 is established via lead 106, cam switch 6, lead 132, and motor switch 118 to the motor 120, and motor switches 130 and 128 via interconnecting lead 136 to the motor 126. The solenoid 114 is energized by a circuit from lead 106 through cam switch 7.

The dispensing of salt is effected by motor 120 during the revolution of its output shaft, the motor 120 becoming deenergized near the end of one revolution as motor switch 118 shifts into engagement with its upper contact. (It is to be understood that the motors 120, 122 and 126 would normally drive the mentioned output shafts through reduction gearing). Energization of the motor 126 operates the lower slide valve 32 through approximately a 15-second cycle, during which time the valve 32 is reciprocated to permit gravity flow to a measured charge of corn from the cylinder 28 into the kettle 10. The lower slide valve 32 is normally closed, thus it opens and then recloses during the 15-second cycle. At the end of such cycle, the motor switches 128 and 130 shift into engagement with their upper contacts, operation of motor switch 130 effecting energization of the upper slide valve motor 122 via a circuit through lead 134 and motor switch 124. Thus, the upper slide valve 130, which is also normally closed, is now reciprocated during approximately a 15-second cycle to permit the measuring cylinder 28 to refill. At the termination of this second cycle, motor switch 124 shifts into engagement with its upper contact to deenergize the motor 122. The motor switches 118, 124 and 128 are now all in engagement with their upper contacts, such contacts being interconnected by lead 116 which extends from the upper contact of cam switch 6. Therefore, when cam switch 6 returns to its normal position at 45 seconds, the three motors 120, 122 and 126 are momentarily energized to return their respective motor switches 118, 124 and 128, 130 to the normal positions thereof illustrated.

With reference to the energization of solenoid 114 by the operation of cam switch 7, this occurs for a time period from 13 seconds to 30 seconds during which time the oil in measuring device 36 drains into the kettle 10. It should be understood that the oil pump 110 would be rendered operative (such as by a manual override switch, not shown) prior to initial starting of the machine to fill the measuring device 36. Operation of the pump 110 terminates upon opening of the pressure-responsive switch 112 which occurs when the measuring device 36 fills and thereby causes a pressure buildup which may be sensed and utilized to automatically cease pump operation. Thereafter, the pump 110 is automatically reactivated at 30 seconds in each timing cycle when cam switch 7 returns to its normal position, since the draining of the oil from the measuring device 36 prior to 30 seconds relieves the oil pressure, thereby causing the switch 112 to close.

Insofar as initial starting of the machine is concerned, the remainder of the 90 second timing cycle is insignificant except for the fact that the gas burner 96 is activated at 63 seconds by the reclosure of cam switch 4. This commences the cooking of the corn and oil to form the popcorn product. The cooking is under the control of the operating thermostat 70 which, for example, would close its switch 70a when the kettle temperature reaches 462° F. This indicates that the popcorn is done and starts the 90-second cycle by energizing the timer motor 54 through the normally closed contact of relay switch 64. The operating thermostat 70, the low temperature thermostat 84, and the high temperature thermostat 88 would all be disposed in the kettle 10, preferably in the bottom section 12 and suitably insulated from the burner 96 which is also carried within the bottom section 12 of kettle 10.

When the timer motor 54 now starts and holds, opening of bottom section 12 in response to operation of the air valve 80 causes the cooked popcorn product to be dumped onto the conveyor 24. The opening of the kettle 10, together with deactivation of the burner 96, causes the temperature within the kettle to drop appreciably. Upon reclosure of the kettle and commencement of the loading thereof with corn and oil, a further temperature drop is produced by the presence of these two primary ingredients. However, if the hopper 26 should inadvertently become depleted or if oil should fail to flow into the kettle 10 during the loading phase, the temperature drop will not be as pronounced as is the case when proper quantities of both corn and oil are introduced into the kettle. The low temperature thermostat 84 senses the temperature drop and, for example, is arranged to effect closure of its switch 84a only when the kettle temperature is above 350° F. Therefore, if the heat loss in the kettle after termination of cooking is not sufficient to reduce the kettle temperature to 350° or less, the switch 84a will remain closed. This is sensed at 60 seconds in the timing cycle when the cam switch 3 is operated; the pole thereof shifting into engagement with its lower contact.

From the foregoing, it may be appreciated that failure of the kettle temperature to decrease to 350° by the 60-second point in the timing cycle establishes the following electrical circuit: From line 48 through switch 84a to cam switch 3, along lead 86 to relay coil 62, and then through coil 62 to line 50. This energizes relay coil 62 to open relay switch 64 and stop the timing motor 54 at approximately the 60-second point in the timing cycle. Simultaneously, relay switch 66 closes to energize the audible alarm 76 and the indicator lamp 78. Since the timing cycle has now been halted short of the 63-second point, cam switch 4 remains open and thus the burner 96 is not reactivated. Therefore, cooking will not commence until the supply problem is rectified, and this is called to the attention of the operator by the alarm 76 and the lamp 78.

The high temperature thermostat 88 is normally closed and opens its switch 88a if the temperature of the kettle 10 reaches 475° F. Coil 102 is energized whenever solenoid 90 is energized to supply gas to the burner 96. Energization of relay coil 102 opens the relay switch 104, thereby preventing operation of the alarm 98 and the indicator lamp 100. However, if the normal operating components of the system should malfunction during the cooking phase and heating of the kettle continues after the popcorn is done, the thermostat switch 88a ultimately opens when the kettle temperature reaches 475° to shut off the burner 96 and deenergize relay coil 102, this action causing closure of relay switch 104 and attendant energization of alarm 98 and indicator lamp 100. Therefore, the temperature of the kettle is prevented from rising to the ignition point of the oil, and the operator is made aware of the system malfunction. The most likely cause of such a malfunction would be the failure of the operating thermostat 70 to close its switch 70a to terminate the cooking phase, in which case the burner 96 would of course remain in operation.

We claim:

1. In an automatic popcorn popper:
    a cooking kettle;
    structure communicating with the kettle for supplying the latter with corn, and having a valve for controlling delivery of the corn to the kettle;
    conduit means communicating with the kettle for supplying the latter with a seasoning, and having a valve for controlling delivery of the seasoning to the kettle;
    means for heating the kettle;
    said kettle being provided with means operable to effect dumping of the cooked popcorn product from the kettle;
    operating means coupled with said dumping means for actuating the latter upon completion of cooking of the product;
    control means coupled with said valves for operating the latter following dumping of the cooked product to effect delivery of preselected quantities of corn and seasoning to the kettle to resupply the latter, whereby the temperature of the kettle drops to a predetermined level indicative of delivery of said quantities;
    temperature responsive means disposed in heat exchange relationship with the kettle for sensing said temperature drop; and
    protective means coupled with said temperature responsive means for preventing said heating means from heating the kettle if the temperature thereof fails to decrease to said level by a predetermined time following said delivery of corn and seasoning thereto.

2. The popper as claimed in claim 1:
    said operating means being coupled with said heating means for deactivating the latter upon said completion of cooking of the product, and reactivating said heating means following said dumping of the cooked product; and
    said protective means preventing the reactivation of said heating means if the temperature of the kettle fails to decrease to said level by said predetermined time.

3. The popper as claimed in claim 2, said operating means including second temperature responsive means disposed in heat exchange relationship with said kettle for effecting deactivation of said heating means if the kettle reaches a temperature indicative of overheating of the product.

4. The popper as claimed in claim 2:
    said operating means including an electrically responsive device for selectively activating and deactivating said heating means, and switching means for controlling energization of said device;
    said temperature responsive means including a switching component and a temperature sensor coupled with said switching component for operating the latter when the temperature of the kettle decreases to said level; and
    said protective means being operably coupled with said switching means and said switching component and responsive to the operational condition of the switching component at said predetermined time for disabling said switching means to prevent said reactivation of the heating means if the operational condition of the switching component indicates that the temperature of the kettle has failed to decrease to said level.

5. The popper as claimed in claim 4:
    there being cyclically operable means common to said operating means, said control means, and said protective means for timing the operation of all of the same; and
    means coupled with said timing means for initiating operation of the timing means through an operational cycle thereof in response to said completion of cooking of the product.

6. The popper as claimed in claim 5, said protective means including circuitry coupled with said timing means for interrupting operation thereof during an operational cycle of the timing means in which the temperature of the kettle fails to decrease to said level.

7. The popper as claimed in claim 5:
    said operating means further including an additional switching means for controlling said dumping means;
    said control means including switching means for controlling operation of said valves;
    said protective means including circuitry having switching means in series with said switching component for sensing the operational condition thereof;
    said timing means being coupled with all of said switching means for operating the latter during each operational cycle of the timing means; and
    said circuitry being coupled with said timing means for interrupting operation thereof during an operational cycle of the timing means in which the temperature of the kettle fails to decrease to said level.

8. The popper as claimed in claim 1;
    an alarm for emitting a warning signal; and said protective means being coupled with said alarm for operating the latter if the temperature of the kettle fails to decrease to said level by said predetermined time.

9. In an automatic popcorn popper:

a cooking kettle;

structure communicating with the kettle for supplying the latter with corn, and having a valve for controlling delivery of the corn to the kettle;

conduit means communicating with the kettle for supplying the latter with a seasoning, and having a valve for controlling delivery of the seasoning to the kettle;

means for heating the kettle;

said kettle having being provided with means operable to effect dumping of the cooked popcorn product from the kettle;

operating means coupled with said dumping means for actuating the latter upon completion of cooking of the product;

control means coupled with said valves for operating the latter following dumping of the cooked product to effect delivery of preselected quantities of corn and seasoning to the kettle to resupply the latter, whereby the temperature of the kettle drops to a predetermined level indicative of delivery of said quantities;

temperature responsive means disposed in heat exchange relationship with the kettle for sensing said temperature drop;

an alarm for emitting a warning signal; and protective means coupled with said temperature responsive means and said alarm for operating the alarm if the temperature of the kettle fails to decrease to said level by a predetermined time following said delivery of corn and seasoning thereto.

10. The popper as claimed in claim 9:

said operating means being coupled with said heating means for deactivating the latter upon said completion of cooking of the product, and reactivating said heating means following said dumping of the cooked product; and said protective means preventing the reactivation of said heating means if the temperature of the kettle fails to decrease to said level by said predetermined time.